US012640586B2

(12) United States Patent
Kydd

(10) Patent No.: US 12,640,586 B2
(45) Date of Patent: May 26, 2026

(54) OPTIMUM UTILIZATION OF ELECTRIC CIRCUIT CAPACITY BY ADDING ELECTRIC VEHICLE CHARGING

(71) Applicant: NetZero V2G Technologies LLC, Fort Washington, PA (US)

(72) Inventor: Paul Harriman Kydd, Lawrenceville, NJ (US)

(73) Assignee: NETZERO V2G TECHNOLOGIES LLC, Fort Washington, PA (US)

( * ) Notice: Subject to any disclaimer, the term of this patent is extended or adjusted under 35 U.S.C. 154(b) by 167 days.

(21) Appl. No.: 17/248,576

(22) Filed: Jan. 29, 2021

(65) Prior Publication Data

US 2022/0247209 A1 Aug. 4, 2022

(51) Int. Cl.
| | |
|---|---|
| *H02J 13/13* | (2026.01) |
| *B60L 53/30* | (2019.01) |
| *G05B 15/02* | (2006.01) |
| *G06Q 30/04* | (2012.01) |
| *G06Q 50/06* | (2012.01) |
| *H02J 13/12* | (2026.01) |

(52) U.S. Cl.
CPC .......... *H02J 13/1335* (2026.01); *B60L 53/30* (2019.02); *G05B 15/02* (2013.01); *G06Q 30/04* (2013.01); *G06Q 50/06* (2013.01); *H02J 13/12* (2026.01)

(58) Field of Classification Search
CPC .......... H02J 13/00026; H02J 13/00002; H02J 3/322; H02J 7/342; B60L 53/30; B60L 53/51; B60L 53/66; B60L 53/67; G05B 15/02; G06Q 30/04; G06Q 50/06

USPC .......................................................... 700/295
See application file for complete search history.

(56) References Cited

U.S. PATENT DOCUMENTS

| | | |
|---|---|---|
| 6,847,937 B1 | 1/2005 | Savage et al. |
| 7,582,979 B2 | 9/2009 | Oyobe et al. |
| 8,227,937 B2 | 7/2012 | Barlock et al. |
| 8,278,881 B2 | 10/2012 | Woody et al. |
| 8,463,449 B2 | 6/2013 | Sanders |
| 8,509,976 B2 | 8/2013 | Kempton |
| 8,575,780 B2 | 11/2013 | Moon |
| 8,599,587 B2 | 12/2013 | Chapman et al. |
| 8,716,891 B2 | 5/2014 | Choi |
| 8,768,533 B2 | 7/2014 | Ichikawa |
| 8,772,961 B2 | 7/2014 | Ichikawa |
| 8,957,547 B2 | 2/2015 | Chang et al. |

(Continued)

OTHER PUBLICATIONS

Beck, Leonard J.; V2G: a text about vehicle-to-grid, the technology which enables a future of clean and efficient electric-powered transportation; 2009-Trzy updated Jul. 2, 2009, Leonard Beck, c2009, Newark, Del., USA.

(Continued)

*Primary Examiner* — Mohammad Ali
*Assistant Examiner* — Saad M Kabir
(74) *Attorney, Agent, or Firm* — Bergman LLC; Michael Bergman

(57) ABSTRACT

This invention enables Electric Vehicle (EV) charging requirements to be supplied by electric power available off-peak without increasing demand charges. It does this by continually measuring primary loads and enabling EV charging to utilize only that power that will not increase total demand. Grouping software available from Electric Vehicle Service Equipment (EVSE) suppliers allows the available power to be shared among multiple vehicles.

17 Claims, 2 Drawing Sheets

(56) References Cited

U.S. PATENT DOCUMENTS

| | | | |
|---|---|---|---|
| 9,263,895 B2 | 2/2016 | Naiknaware et al. | |
| 9,276,410 B2 | 3/2016 | Binder et al. | |
| 9,293,948 B2 | 3/2016 | Freitas et al. | |
| 9,436,179 B1 | 9/2016 | Turney et al. | |
| 9,481,259 B2 | 11/2016 | Choi et al. | |
| 9,520,623 B2 | 12/2016 | Honma et al. | |
| 9,573,478 B2 | 2/2017 | Jefferies et al. | |
| 9,577,291 B2 | 2/2017 | Kolavennu et al. | |
| 9,584,047 B2 | 2/2017 | Frohman et al. | |
| 9,705,333 B2 | 7/2017 | Clifton | |
| 9,754,300 B2 | 9/2017 | Kempton et al. | |
| 9,758,046 B2 | 9/2017 | Harper et al. | |
| 9,783,068 B2 | 10/2017 | Eger et al. | |
| 9,796,258 B1 | 10/2017 | Bundschuh et al. | |
| 9,821,669 B2 | 11/2017 | Tanabe | |
| 9,845,021 B2 | 12/2017 | Yang et al. | |
| 9,852,481 B1 | 12/2017 | Turney et al. | |
| 9,862,287 B2 | 1/2018 | Tang et al. | |
| 9,948,101 B2 | 4/2018 | Chow | |
| 9,987,941 B2 | 6/2018 | Miftakhov et al. | |
| 10,007,259 B2 | 6/2018 | Turney et al. | |
| 10,126,796 B2 | 11/2018 | Dorn et al. | |
| 10,137,796 B2 | 11/2018 | Huang et al. | |
| 10,140,670 B2 | 11/2018 | Gow | |
| 10,166,877 B2 | 1/2019 | Zeng et al. | |
| 10,166,882 B2 | 1/2019 | Yang et al. | |
| 10,173,543 B2 | 1/2019 | Yang et al. | |
| 10,186,865 B2 | 1/2019 | Chiang et al. | |
| 10,333,306 B2 | 6/2019 | Hooshmand et al. | |
| 10,333,307 B2 | 6/2019 | Hooshmand et al. | |
| 10,439,428 B2 | 10/2019 | Kydd | |
| 10,693,315 B2 | 6/2020 | Kydd | |
| 10,873,210 B2 | 12/2020 | Lowenthal et al. | |
| 10,913,370 B2 | 2/2021 | Kubota et al. | |
| 11,043,835 B2 | 6/2021 | Kydd | |
| 11,264,843 B1 | 3/2022 | Lim et al. | |
| 2003/0205936 A1 | 11/2003 | Beckerman et al. | |
| 2007/0043478 A1* | 2/2007 | Ehlers | F24F 11/58 |
| | | | 700/276 |
| 2008/0111424 A1 | 5/2008 | Yeh | |
| 2009/0179495 A1 | 7/2009 | Yeh | |
| 2010/0019577 A1 | 1/2010 | Barlock et al. | |
| 2011/0133693 A1 | 6/2011 | Lowenthal et al. | |
| 2011/0202192 A1 | 8/2011 | Kempton | |
| 2011/0202217 A1 | 8/2011 | Kempton | |
| 2011/0202401 A1 | 8/2011 | Kempton et al. | |
| 2011/0202418 A1 | 8/2011 | Kempton et al. | |
| 2011/0204851 A1 | 8/2011 | Manotas, Jr. | |
| 2011/0245987 A1 | 10/2011 | Pratt et al. | |
| 2012/0032636 A1 | 2/2012 | Bianco | |
| 2012/0106672 A1 | 5/2012 | Shelton et al. | |
| 2012/0223675 A1 | 9/2012 | Bianco | |
| 2012/0267952 A1 | 10/2012 | Ballatine et al. | |
| 2013/0020873 A1 | 1/2013 | Barlock et al. | |
| 2013/0080254 A1 | 3/2013 | Thramann | |
| 2013/0124005 A1 | 5/2013 | Ichikawa | |
| 2013/0141040 A1 | 6/2013 | DeBoer et al. | |
| 2013/0313243 A1 | 11/2013 | Gonze et al. | |
| 2013/0328527 A1 | 12/2013 | Kang | |
| 2014/0062401 A1 | 3/2014 | Gadh et al. | |
| 2014/0067140 A1 | 3/2014 | Gow | |
| 2014/0277788 A1* | 9/2014 | Forbes, Jr. | H02J 3/14 |
| | | | 700/286 |
| 2015/0015213 A1 | 1/2015 | Brooks et al. | |
| 2015/0097527 A1 | 4/2015 | DeDona et al. | |
| 2015/0326012 A1 | 11/2015 | Tsuchiya | |
| 2016/0006245 A1 | 1/2016 | Chow | |
| 2016/0137082 A1 | 5/2016 | Jefferies et al. | |
| 2016/0137087 A1 | 5/2016 | Haas et al. | |
| 2016/0137149 A1 | 5/2016 | Kamachi et al. | |
| 2016/0207409 A1 | 7/2016 | Ueo | |
| 2016/0211676 A1 | 7/2016 | Chiang et al. | |
| 2016/0294022 A1 | 10/2016 | Thramann et al. | |
| 2017/0129356 A1 | 5/2017 | Johnson | |
| 2017/0155253 A1 | 6/2017 | Veda et al. | |
| 2017/0168516 A1 | 6/2017 | King | |
| 2018/0018007 A1 | 1/2018 | Dorn et al. | |
| 2018/0037121 A1 | 2/2018 | Narla | |
| 2018/0090935 A1 | 3/2018 | Asghari et al. | |
| 2018/0105052 A1 | 4/2018 | Patil et al. | |
| 2018/0244170 A1 | 8/2018 | Kydd | |
| 2019/0036341 A1 | 1/2019 | Asghari et al. | |
| 2019/0056451 A1 | 2/2019 | Asghari et al. | |
| 2019/0079473 A1 | 3/2019 | Kumar et al. | |
| 2019/0131923 A1 | 5/2019 | Hooshmand et al. | |
| 2019/0137956 A1 | 5/2019 | Hooshmand et al. | |
| 2019/0140465 A1 | 5/2019 | Hooshmand et al. | |
| 2019/0147552 A1 | 5/2019 | Nakayama et al. | |
| 2019/0148945 A1 | 5/2019 | Nakayama et al. | |
| 2019/0206000 A1 | 7/2019 | ElBsat et al. | |
| 2019/0288347 A1 | 9/2019 | Yokoyama et al. | |
| 2019/0322178 A1 | 10/2019 | Sturza et al. | |
| 2019/0369166 A1 | 12/2019 | Moslemi et al. | |
| 2020/0031238 A1 | 1/2020 | Kydd | |
| 2020/0067400 A1 | 2/2020 | Li et al. | |
| 2020/0101850 A1 | 4/2020 | Harty et al. | |
| 2021/0273453 A1 | 9/2021 | Nisho et al. | |
| 2021/0291670 A1 | 9/2021 | Kaufman et al. | |
| 2022/0190639 A1* | 6/2022 | Nelson | H02J 13/00002 |
| 2022/0250498 A1 | 8/2022 | Okada et al. | |

OTHER PUBLICATIONS

SAE International; SAE Electric Vehicle and Plug in Hybrid Electric Vehicle Conductive Charge Coupler; J1772 Oct. 2012; Issued Oct. 1996; Revised Oct. 2012.

Kristian, Maggie; Great Plains Institute; Pilot Project Gets Solar Panels in Sync with Electric Vehicle Chargers; Jan. 9, 2020; https://betterenergy.org/blog/solar-synchronization-electric-vehicle-chargers/.

Trabish, Herman; Utility Dive; Utilities in hot water: Reqalizing the benefits of grid-integrated water heaters; Jun. 20, 2017; https://www.utilitydive.com/news/utilities-in-hot-water-realizing-the-benefits-of-grid-integrated-water-hea/445241/.

Open vs. Closed Charging Stations: Advantages and Disadvantages; Open Charge Alliance; Aug. 8, 2018; https://www.openchargealliance.org/uploads/files/OCA-Open-Standards-White-Paper-compressed.pdf.

File History for U.S. Appl. No. 14/101,423.
File History for U.S. Appl. No. 15/441,484.
File History for U.S. Appl. No. 16/055,972.
File History for U.S. Appl. No. 16/562,565.
File History for U.S. Appl. No. 16/580,663.
File History for U.S. Appl. No. 17/330,662.
File History for U.S. Appl. No. 16/563,108.
File History for U.S. Appl. No. 17/333,236.

* cited by examiner

OPTIMUM UTILIZATION OF ELECTRIC CIRCUIT CAPACITY BY ADDING ELECTRIC VEHICLE CHARGING

CROSS-REFERENCE TO RELATED APPLICATIONS

This application is related to U.S. patent application "Vehicle-Solar-Grid Integration" Ser. No. 14/101,423 filed Dec. 10, 2013, now issued as U.S. Pat. No. 9,566,867, Feb. 14, 2017, by the present inventor, and Provisional Patent Applications "Bidirectional Power Electronic Interface" No. 61/889,067, filed Oct. 10, 2013, "Bidirectional Power Electronic Interface with Sustaining Power" 61/921,583, filed Dec. 30, 2013, "Vehicle-Solar-Grid Integration with Supplementary Battery" 62/050,819, filed Sep. 16, 2014, "Low-Cost EVPV for Vehicle-Solar-Grid Integration" 62/297,462, filed Feb. 19, 2016, "Minimum Cost EVPV for Vehicle-Solar-Grid Integration" 62/299,756, filed Feb. 25, 2016, later filed as non provisional patent application Ser. No. 15/441,484, Feb. 24, 2017, now issued as U.S. Pat. No. 10,439,428, Oct. 8, 2019, and a companion filing "Method of Using Minimum Cost EVPV for Vehicle-Solar-Grid Integration" Ser. No. 16/562,565, Sep. 3, 2019, "Vehicle-Solar-Grid Integration for Back up Power" 62/465,424 filed Mar. 1, 2017 now filed as non provisional patent application Ser. No. 16/044,683, application Ser. No. "Non Grid-Tied Vehicle-Solar Uninterruptable Power System" 62/544,041, filed Aug. 11, 2017, now filed as patent application Ser. No. 16/055,035, and "Demand Charge Management by Electric Vehicles", 62/721,216, filed Aug. 22, 2018, and now filed as non provisional patent application Ser. No. 16/563,108, "Minimum Cost Demand Charge Management by Electric Vehicles", "Electric Vehicle Service Equipment Adapter Module to Control Added Loads", Ser. No. 16/580,663 Sep. 24, 2019, by the present inventor, and "Multiple Load Micro-Grid Implementation of Vehicle-Solar-Grid Integration" 62/320,701, filed Apr. 11, 2016, by the present inventor and Brian R. Hamilton of Cranbury, NJ, and Chris A. Martin of Media, PA.

I claim priority for this invention by virtue of provisional patent application "Optimum Utilization of Circuit Capacity by Adding Electric Vehicle Charging" filed on Feb. 19, 2020, Application No. 62/978,381.

FEDERALLY SPONSORED RESEARCH

None

CITED LITERATURE

"SAE J-1772 Standard for Electric Vehicle Charging Equipment", Revised, October, 2012.

U.S. Pat. Nos. 10,333,307, and 10,333,306, Hooshmand, and U.S. Patent Applications 2019-0369166, Moslemi, 2019-0148945, 2019-0147552, Nakayama, 2019-0140465, 2019-0137956, 2019-0131923, Hooshmand, and 2019-0056541, 2019-0036341, 2018-0090935, Ashgari, all assigned to NEC.

U.S. Pat. No. 9,520,623 Honma, assigned to Panasonic 2019-0079473 Kumar, 2019-0206000, ELBsat assigned to Johnson controls 2018-0018007 and U.S. Pat. No. 10,126,796, Doorn, assigned to Accenture 2016-0211676 and U.S. Pat. No. 10,186,865, Chiang, assigned to Aver Information 2016-0006245, and U.S. Pat. No. 9,948,101, Chow, 2014-0067140, Gow, assigned to Green Charge Networks, U.S. Pat. No. 10,140,670, Gow, assigned to Energie Storage Services.

FIELD OF THE INVENTION

The present disclosure describes a system and method for electric vehicle charging that allows vehicles to be recharged without incurring added demand charges from an electric energy supplier. It is a system for increasing the utilization of electric circuitry both behind the meter, and more particularly to electric vehicle charging that is controlled to minimize demands on the electric grid.

BACKGROUND OF THE INVENTION

Electric Vehicles (EVs) with their very large storage batteries ranging in capacity from 16 to over 60 kiloWatt hours (kWh) represent a major new load on the electric energy supply grid that can be a source of needed revenue to the electric utilities and a very economical source of energy for personal transportation. Uncontrolled, however, this load can be a major problem. If every EV plugs in and begins to recharge at 5 PM, it can aggravate the peak load on the entire electric grid system from generation through transmission to distribution, resulting in high-cost energy due to high wholesale prices, and increased demand charges by the distribution companies. But this problem can be controlled due to the flexibility of EV charging. Because it doesn't matter when the EV is charged, as long as it is ready to go the next day, it is possible to allow the EV driver to plug in at 5 PM, but delay the actual charging until the early morning hours when electric energy is available and inexpensive, and when excess transmission and distribution capacity are available.

Managed charging is enabled by the communication functions of the Internet and the wireless telephone infrastructure underlying the "Internet of Things". Individual devices can be aggregated and controlled via the Internet "cloud" providing data handling and reporting functions. The devices in this case are Electric Vehicle Service Equipments (EVSEs) which link the electric power available from the grid, typically as 240 V, single-phase, Alternating Current (AC) in residences, to the on-board charger on the EV via a flexible cable and plug. The design and operating details of the EVSE and plug are specified in SAE Standard J-1772.

There is an opportunity to increase the efficiency with which electric circuitry is utilized still further by grouping EVSEs together while limiting the amount of power (in kiloWatts, kW) that the group can draw. Grouping is a feature that several EVSE manufacturers offer. It operates by networking a specified group of EVSEs over the Internet so that cloud-resident software can limit the amount of power drawn by the group to a specified amount, and distribute this amount evenly to the EVSEs in the group.

For example if a street lighting transformer has a rating of 25 kiloVolt-Amps, kVA and a normal load of 12 kVA at night, it can power a group of two 10 kW EVSEs with a limiting amount of 13 kVA. It can support the lights and a single EVSE at full power at night. If another vehicle plugs in, the two vehicles share the 13 kVA limit at 6.5 kW each. During the day, when the lights are off, both EVSEs can draw their full 10 kW.

It would be desirable if the grouping system could measure the actual draw for the primary use and adjust the limit on the group accordingly. For example, in the morning as the lights turn off, one by one under photocell control, the amount of power available for EV charging could be increased continuously providing the maximum in EV charging power and optimizing the utilization of the relevant circuitry without overloading it. That is the objective of this invention.

This invention can serve to improve circuit utilization in many situations beyond the street lighting example recited above. As Electric Vehicles become common, demand for recharging facilities will increase, representing a major investment requirement unless they can be serviced efficiently with existing wiring. Any increase in electric demand due to EV charging will bring with it increased demand charges from the local electric energy distribution company. It is another objective of this invention to provide for the installation of EVSEs using excess off-peak capacity of existing circuitry to service the additional load without requiring additional capacity or increased demand charges.

BRIEF SUMMARY OF THE INVENTION

The objectives of this invention are achieved by a system having the ability to measure the primary load on a metered circuit and to control a group of EVSEs to utilize as much power as will not exceed the monthly demand charge limit for the primary load. The system comprises a meter on the primary circuit input and a controller with a microcomputer running software that can limit the total load including the group of EVSEs to the expected monthly demand charge limit. The controller does this by outputting a limit signal to cloud-resident grouping software that can control the operation of the EVSEs.

This invention is particularly applicable to circuits with limited capability such as the street lighting example cited above. Also to metered circuits in residential and commercial buildings where it is desired to offer EV charging without upgrading electric supply capacity or increasing demand charges.

DETAILED DESCRIPTION OF THE INVENTION: THE PREFERRED EMBODIMENT

Figure 1:
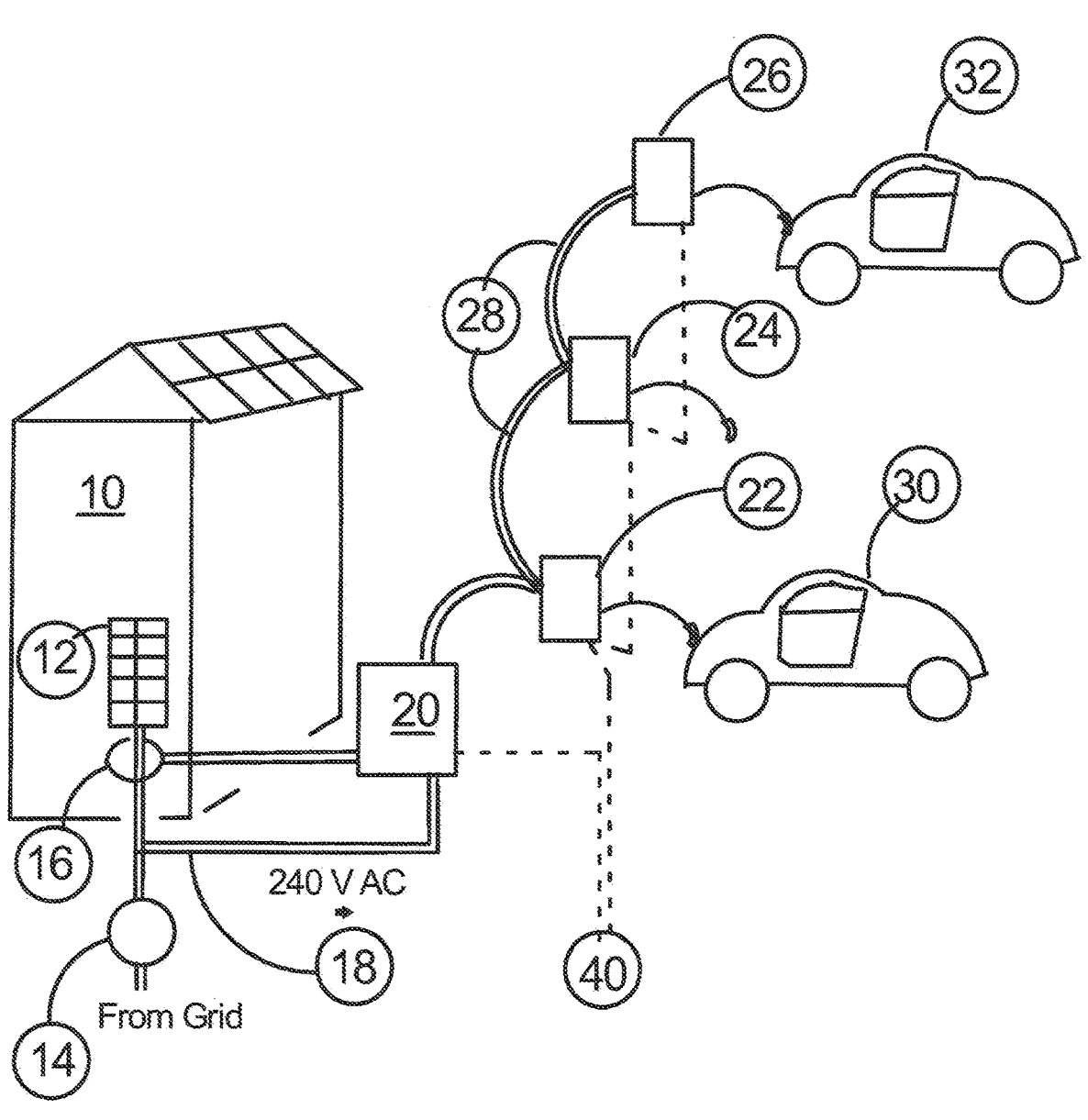
FIG. 1 is a schematic diagram showing the system of this invention applied to a building with a metered electric energy supply and added EVSEs.

FIG. 1 shows a building 10 with electric distribution panel 12 supplied with electric energy from the electric grid through meter 14. EVSEs 22, 24 and 26 are grouped on circuit 28, which is controlled by the system controller 20 of this invention. Controller 20 reads current transformer 16 deployed between meter 14 and circuit panel 12 to measure the primary load on the circuit. Tap 18 prior to transformer 16 provides electric power to group 28, which is not measured by current transformer 16. Controller 20 comprises a microcomputer to run software to control charging in accord with this invention and communication equipment to communicate with WiFi router or cellphone connection to the Internet 40, which also communicates with EVSEs 22, 24 and 26. Electric vehicles 30 and 32 are plugged in to EVSEs 22 and 26 waiting for controller 20 to enable charging by transmitting an available power limit signal through router 40 to the cloud which will return charging signals distributing the available power equally to 30 and 32.

Figure 2:
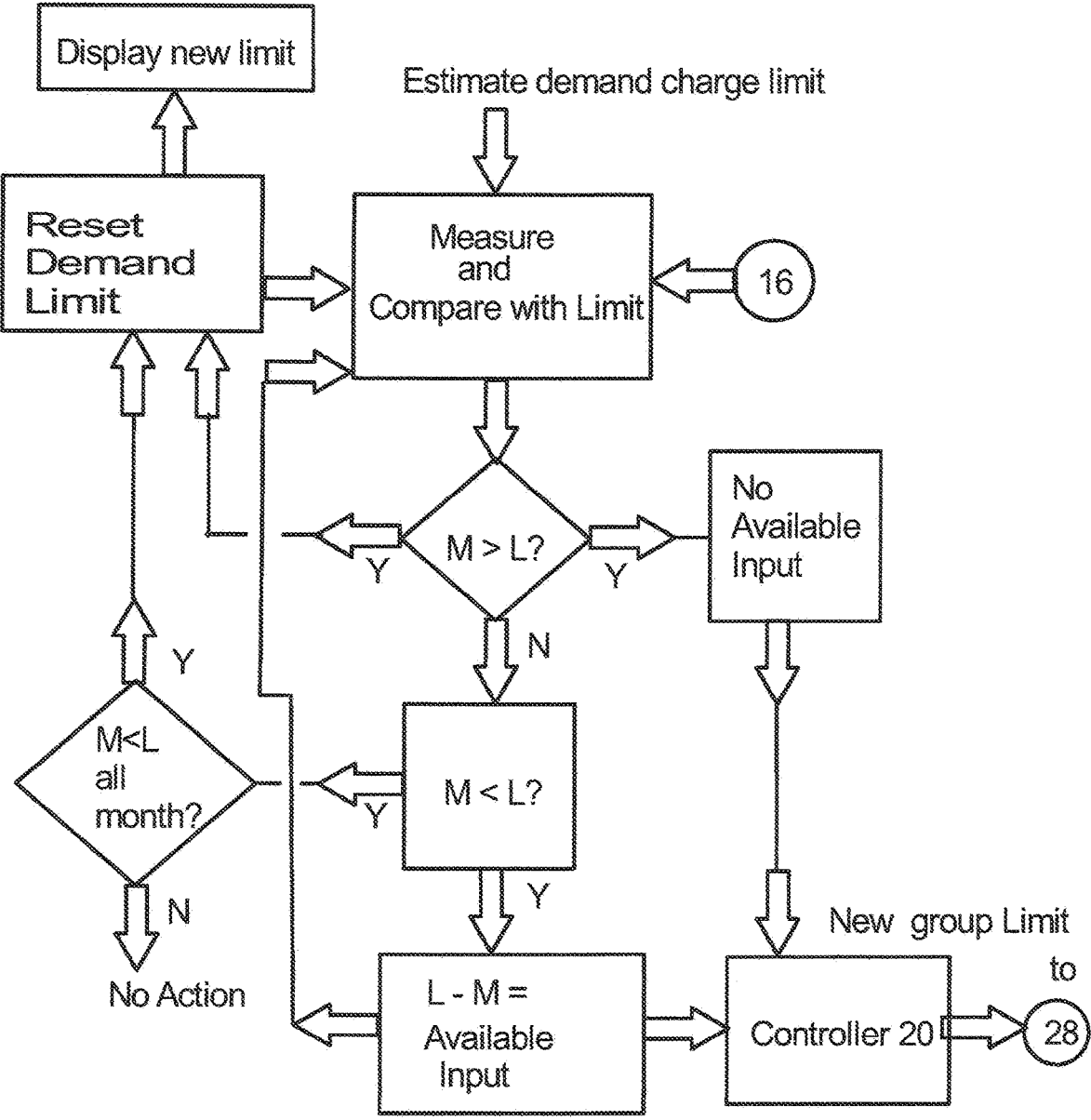
FIG. 2 is a schematic diagram of software used by the system of FIG. 1 to achieve continuous evaluation of the amount or power available for EV charging and of the expected demand charge limit.

FIG. 2 is a schematic diagram of the software in controller 20, which controls EVSE group 28 and recalculates from month to month the demand charge limit. The program is started with an estimate of the demand charge limit L derived from previous month's electric bills. This is an estimated maximum demand for the primary loads of the building, which determine the demand charge leveled by the electric distribution company. As long as the demand measured by current transformer 16, M, is lower that the estimated demand charge limit, controller 20 sets the limit for the group of EVSEs at the difference between the measured primary demand M and the demand charge limit L. The EVSE cloud-based grouping software then splits up the available EVSE power A=L−M between EVs 30 and 32 which are plugged in ready to charge. In the early morning hours with low primary demand and few EVs plugged in they may be able to draw maximum power without increasing demand. At other times with more EVs or less power available above the primary needs, the group of EVSEs will share the available power, but in all cases the circuit will be providing the maximum power that can be used at the limiting power that is available and thus at minimum cost. The result is an increase in the efficiency of utilization of electric energy supply based on the ability of EVs to accept energy at variable rates and variable times without prejudicing the utility of the vehicles.

Controller 20 measures the demand for primary loads at suitable intervals such as the 15 minutes often used for demand charging. If the measured primary load is greater than the estimated limit, M>L, the limit will need to be reset upwards because next month's bill will show a higher demand. Also there is no room for EV charging and a signal to that effect is sent to Group 28.

If M is not greater than L, L<M, two actions are taken. First, the actual M readings are stored in a register for a monthly billing period and if all M for the month are lower than L the highest M for the month is the new (lower) L for the next month.

Second, L−M is the available power for EV charging, which is transmitted by controller 20 to group 28 as the new group limit. The EVSE group utilizes this available power to recharge the EVs in the most efficient manner. If there is enough power available and few enough EVs connected the EVs will be charged at maximum power. If there are more EVs or less power, the available power will be apportioned among the EVs by the EVSE supplier over the internet as they are programmed to do by the EVSE manufacturer The program then recycles to the next measurement M and comparison of M and L.

Example

Starting with the configuration shown in FIG. 1 at midnight with an estimated demand charge limit L of 50 kW and a measured primary load M of 25 kW there is 25 kW of capacity to charge the two EVs connected, and each can charge at the maximum rating of the EVSEs of 10 kW. The total load, primary plus EVs, is 45 kW.

At 6 AM the primary load has risen to 35 kW and the controller 20 has signaled to the cloud-based grouping software controlling EVSE group 28 that the group limit is now down to 15 kW. The grouping software splits this between the two EVs and allows each to charge at 7.5 kW. The total load is 50 kW.

At noon the primary load is 40 kW and the group limit is 10 kW. If only one EV wants to charge it gets the full 10 kW. The total load is 50 kW.

At 6 PM the primary load is 50 kW, the group limit is zero and even though two EVs are back and plugged in, the EV group load is limited to zero, but the total load is 50 kW. The EVs will have to wait until the primary load drops enough to make some capacity available to them. However, they can readily do this since in the early morning hours they can accumulate as much as 60 kWh each, which will take them up to 240 miles each next day.

From this example one can see that although the primary load varies from 25 to 50 kW, a typical range from night to day, by means of this invention and the ability to manage group charging provided by the EVSE manufacturers, the overall load including EVs is almost constant but the demand charge is not increased. The cost of the extra 300 kWh of energy available to recharge the vehicles is just the cost of energy, and the minimum off-peak cost at that.

RELEVANT PREVIOUS LITERATURE

There are a great many US Patents and Patent Applications on the use of electric energy storage to manage peaks in demand and control demand charges. A number of inventors, Hooshmand, Moshlemi, Nakayama, Ashgari have assigned such patents to NEC, Princeton, NJ, USA. They are primarily concerned with the method of calculating the amount of offsetting power needed from a storage system to control demand charges.

Chiang describes managing charging strips so that the ones most in need are charged first and all are charged adequately, similar to group charging of Electric Vehicles.

Gow calculates a cost of energy and adds energy from storage if warranted.

Doorn allocates EVs to locations where grid power is most available

Chow measures energy consumed by primary loads and calculates an offset from storage to minimize demand charges.

None of the above disclose a system for measuring the demand of primary loads and filling in the gap with a tailored load which is the essence of this invention. While the drawings and descriptions in this application are intended to be comprehensive, it will be understood by those skilled in the art that there are similar means to achieve the same ends, which fall within the claimed scope of this invention.

I claim:

1. A system comprising:
   communication equipment and software to control operation of a group of Electric Vehicle Service Equipments (EVSEs),
   said group of Electric Vehicle Service Equipments (EVSEs) providing electric energy recharging facilities to one or more Electric Vehicles,
   a source of electric energy supplying a building or other facility,
   an electric energy meter to measure the electric power load on the source, and
   a current tap to provide electric energy to the group of EVSEs from the source of electric energy, said current tap being disposed between said electric energy meter and a current transformer of said building or other facility,
   wherein said software is adapted to enable recharging of said one or more electric vehicles without increasing the measured demand on the source of electric energy by providing a demand charge limit derived from previous months electric bills and a plurality of measurements of a primary load made by said current transformer, and allowing said one or more Electric Vehicles to receive, through said current tap, a quantity of said electric energy up to a difference between said demand charge limit and a particular measurement of said primary load made by said current transformer.

2. The system of claim 1 in which an additional electric energy meter is installed to measure the electric power load on the building, exclusive of the power consumed by the EVSEs.

3. The system of claim 1 in which said communication equipment includes a WiFi internet router.

4. The system of claim 1 in which said communication equipment includes a cellular phone connection.

5. The system of claim 1 in which the software is resident in an on site micro controller.

6. The system of claim 1 in which the software is resident in the cloud.

7. An Electric Vehicle Service Equipment (EVSE) charging system comprising:
   a source of electric energy operatively coupled to a facility to supply said facility with a respective portion of said electric energy;
   an electric energy meter, said electric energy meter being operatively coupled between said source of electric energy and said facility, said electric energy meter being adapted to measure an electric power load on said source;
   a current tap, said current tap being operatively coupled to said source of electric energy between said electric energy meter and a current transformer of said facility;
   a group, said group including one or more EVSEs, said one or more EVSEs being operatively coupled through said current tap to said source of electric energy, each EVSE of said one or more EVSEs being adapted to supply a further respective portion of said electric energy to one or more electric vehicles for charging said one or more electric vehicles;
   communication equipment; and
   software, said software being adapted to enable recharging of said one or more electric vehicles without increasing a measured demand on the source of electric energy by providing a demand charge limit derived from a previous electric bill and a plurality of measurements of a primary load made by said current transformer, and allowing said one or more Electric Vehicles to receive, through said current tap, a quantity of said electric energy up to a difference between said demand charge limit and a particular measurement of said primary load made by said current transformer.

8. An EVSE charging system as defined in claim 7 wherein said facility comprises a building.

9. An EVSE charging system as defined in claim 7 wherein said electric energy meter is adapted to measure said electric energy in kilowatts.

10. An EVSE charging system as defined in claim 7 wherein said software communicates through the cloud to said group.

11. An EVSE charging system as defined in claim 7 further comprising an additional electric energy meter, said additional electric energy meter being operatively coupled between said current tap and said facility, said additional electric energy meter being adapted to measure an electric power load of said facility.

12. An EVSE charging system as defined in claim 7 wherein said communication equipment comprises a Wi-Fi Internet router.

13. An EVSE charging system as defined in claim 7 wherein said communication equipment comprises cellular phone equipment.

14. An EVSE charging system as defined in claim 7 wherein said system comprises a controller, said controller including a microcomputer.

15. An EVSE charging system as defined in claim 14 wherein said software is resident within said controller.

16. An EVSE charging system as defined in claim 7 wherein said software is resident in the cloud.

17. A system comprising:

communication equipment and software to control operation of a group of Electric Vehicle Service Equipments (EVSEs), said group of Electric Vehicle Service Equipments (EVSEs) providing electric energy recharging facilities to one or more Electric Vehicles, a source of electric energy supplying a building or other facility, an electric energy meter to measure the electric power load on the source, and a current tap to provide electric energy to the group of EVSEs from the source of electric energy, said current tap being disposed between said electric energy meter and a current transformer of said building or other facility, wherein said software is adapted to enable recharging of said one or more electric vehicles without increasing the measured demand on the source of electric energy by providing a demand charge limit derived from previous months electric bills and a plurality of measurements of a primary load made by said current transformer.

* * * * *